United States Patent [19]

Cuneo

[11] Patent Number: 4,523,115

[45] Date of Patent: Jun. 11, 1985

[54] SWITCHING DEVICE FOR REVERSING A PORTABLE ELECTRIC TOOL

[75] Inventor: Giuseppe Cuneo, Calolziocorte, Italy

[73] Assignee: Black & Decker Inc., Newark, Del.

[21] Appl. No.: 622,113

[22] Filed: Jun. 19, 1984

[30] Foreign Application Priority Data

Jun. 21, 1983 [IT] Italy .............................. 22175/83[U]

[51] Int. Cl.³ .......................... H02K 7/14; H01H 9/06

[52] U.S. Cl. .................................. 310/50; 310/68 A; 200/1 V; 200/157

[58] Field of Search .......... 310/47, 50, 68 A, DIG. 6; 200/1 V, 157, 252, 258, 260, 279, 292, 321, 322, 324, 332

[56] References Cited

U.S. PATENT DOCUMENTS

| | | | |
|---|---|---|---|
| 3,440,465 | 4/1969 | Pratt et al. | 310/50 X |
| 3,703,646 | 11/1972 | Jacyno | 310/47 |
| 4,097,704 | 6/1978 | Piber | 310/50 X |
| 4,342,931 | 8/1982 | Grossmann et al. | 310/50 |
| 4,348,603 | 9/1982 | Huber | 310/68 A X |

*Primary Examiner*—Mark O. Budd
*Attorney, Agent, or Firm*—Ronald Sherer; Edward D. Murphy; Harold Weinstein

[57] ABSTRACT

A portable electric tool has a switching device for reversing the direction of the current through the motor to reverse the motor. The switching device comprises two pairs of contacts which extend in cantilever fashion from a circuit board, a rotatable shaft having axially spaced apart terminals thereon, and the terminals being electrically insulated from the contacts by insulating collars secured to the shaft. Each collar has a window therein for access to the respective terminal, the contacts being resiliently biased against the collars with one of each pair of contacts engaging a respective terminal through the respective window in one direction of rotation of the motor and the other of each pair of contacts engaging the opposite respective terminal through the respective window in the opposite direction of rotation of the motor. A shoulder on the shaft may have flats to prevent rotation of the shaft while the trigger of a trigger-switch is actuated.

17 Claims, 5 Drawing Figures

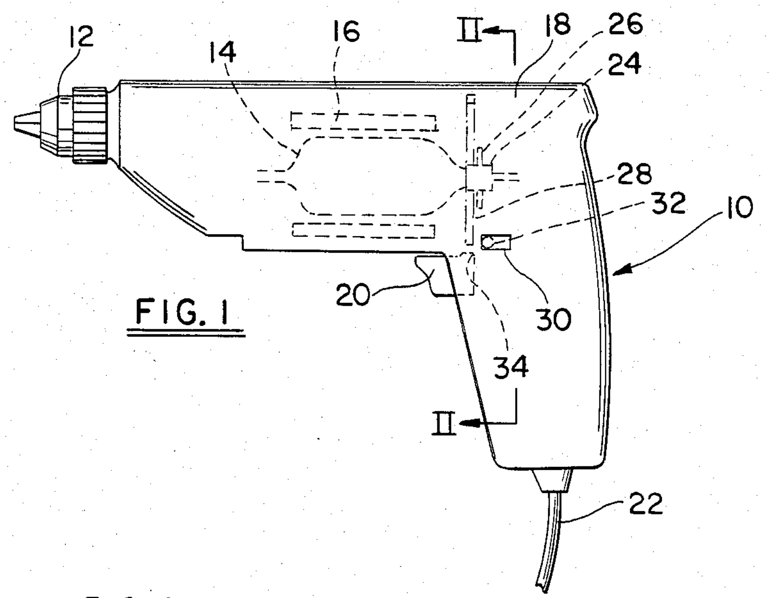
FIG. 1
FIG. 2
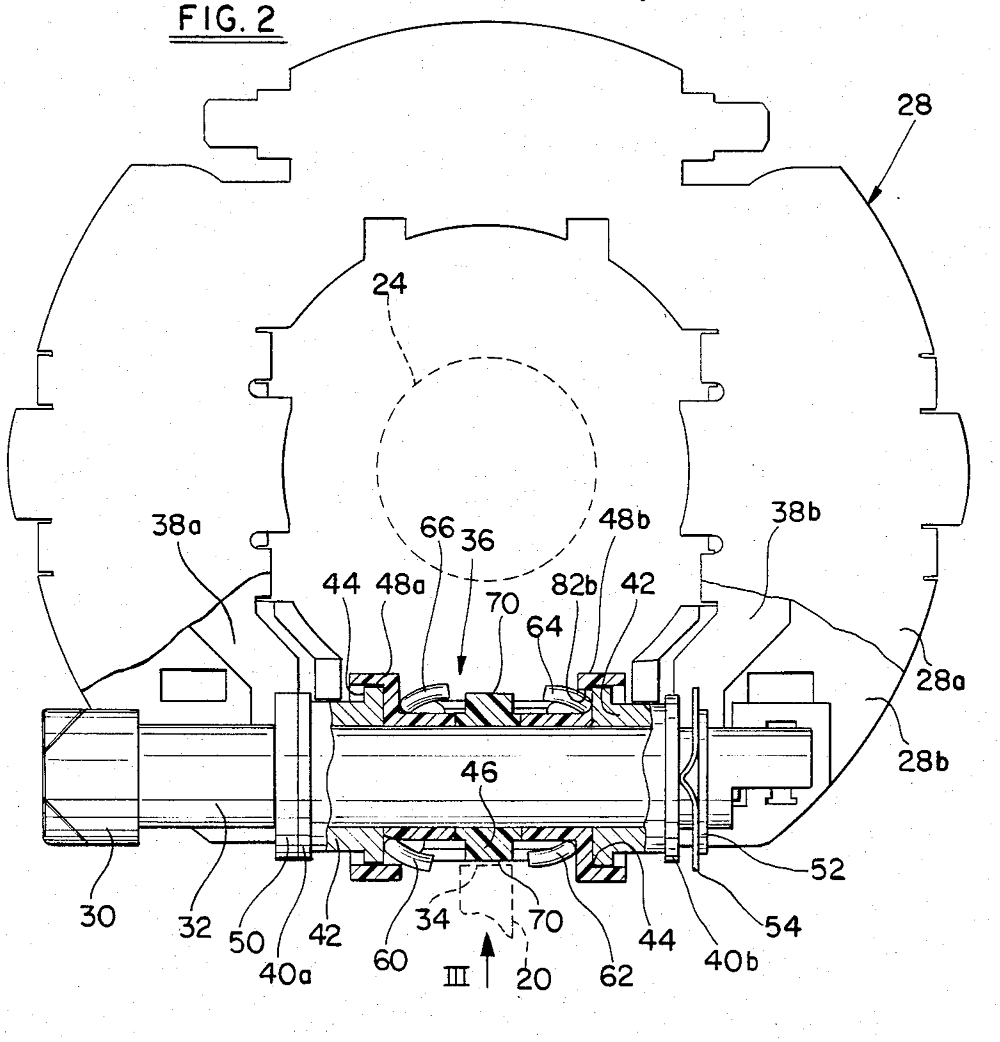

SWITCHING DEVICE FOR REVERSING A PORTABLE ELECTRIC TOOL

FIELD OF THE INVENTION

The present invention relates to switching devices for reversing the commutation of electric motors to reverse the direction of rotation thereof, particularly in portable electric tools.

BACKGROUND OF THE INVENTION

It is known in portable electric tools, such as drills, screwdrivers, etc., to incorporate a reversing switch for reversing the direction of rotation of the motor.

Such switches are often incorporated with a trigger switch for energising the motor. It is further known to incorporate an interlocking mechanism between the trigger switch and the reversing switch to prevent actuation of the reversing switch while the trigger switch is being actuated.

However, such reversing switches have limitations either in performance, assembly or cost.

SUMMARY OF THE INVENTION

It is an object of the present invention to provide an improved arrangement for reversing the motor in a portable electric tool.

A feature by which this object is achieved is the provision of terminals on a rotatable shaft provided with insulating collars having windows through which cantilevered contacts can engage. This provides the advantages of simplicity, easily manufactured inexpensive components, and excellent level of performance.

A further feature of the invention is the mounting of the rotatable shaft in brackets which extend from a circuit board. This provides the advantages of enabling convenient location of the switching device and simplifying electrical connections.

An optional feature of the invention is the provision of a shoulder with flats thereon on the rotatable shaft for coacting with the trigger of the trigger switch. This has the advantage of providing a simple, robust, yet inexpensive way of preventing reversing of the motor while the trigger switch is actuated.

Accordingly, there is provided by the present invention a portable electric tool having an electric motor and a switching device for reversing the direction of the current through the motor to reverse the motor. The switching device comprises two pairs of contacts which extend in cantilever fashion from a circuit board, a rotatable shaft having axially spaced apart terminals thereon, the terminals being electrically insulated from the contacts by insulating collars secured to the shaft. Each collar has a window therein for access to the respective terminal, the contacts being resiliently biased against the collars with one of each pair of contacts engaging a respective terminal through the respective window in one direction of rotation of the motor, and the other of each pair of contacts engaging the opposite respective terminal through a respective window in the opposite direction of rotation of the motor.

Preferably, each pair of contacts are formed from a single conductor shaped to have two cantilevered portions connected by a base portion, which is secured to and electrically connected to the circuit board.

Advantageously the windows are offset from each other with respect to the axis of rotation of the shaft.

Preferably, the circuit board comprises an annular printed circuit board through the center of which a commutator of the motor extends, the circuit board being perpendicular to the axis of rotation of said motor with the shaft spaced parallel to the circuit board and the pairs of contacts being located on opposite sides of the shaft.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 1 is a side elevational view of a portable electric drill according to the invention with some internal parts shown in broken lines;

FIG. 2 is a view on the line II—II of FIG. 1 of a printed circuit board provided with a switching device according to the invention for changing the direction of rotation of the electric motor, some parts being in section;

DETAILED DESCRIPTION OF THE PREFERRED EMBODIMENT

Figure 3:
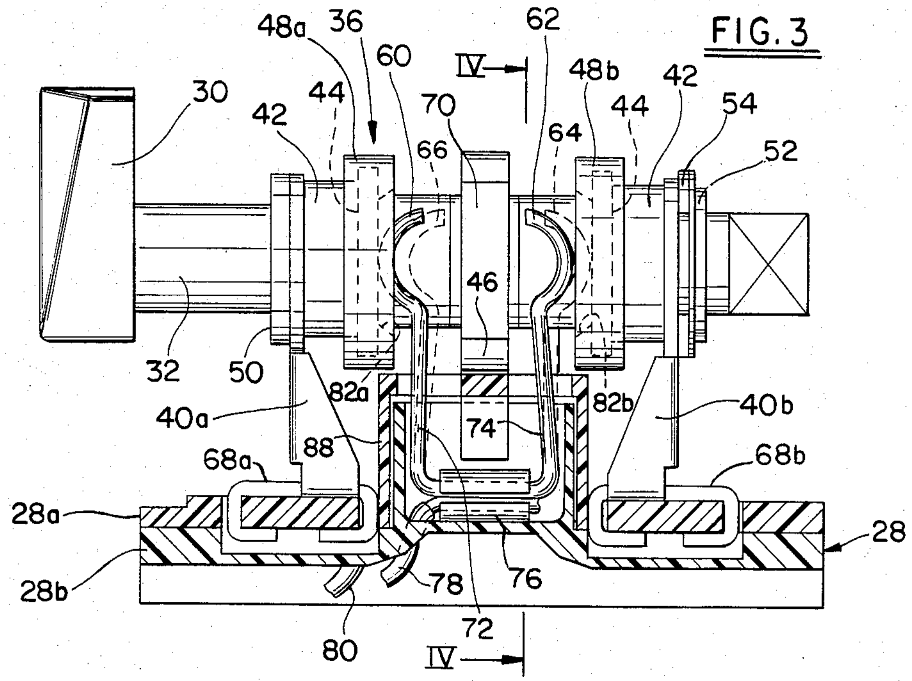
FIG. 3 is a view in the direction of the arrow III of FIG. 2 of the switching device with the printed circuit board in section.

FIG. 1 illustrates a portable electric drill 10 having a chuck 12 driven by an armature 14 rotatable within field coils 16. The drill has a plastic material housing 18 and has an on/off switch actuated by a trigger 20, power being supplied to the drill 10 via a supply cord 22 extending from a pistol grip handle of the housing 18. The armature 14 has a commutator 24 with associated carbon brushes 26, the commutator 24 passing through a central orifice in an annular-like printed circuit board 28 containing circuitry connecting the trigger switch 20 and other electrically functional components of the drill 10. A pivoted lever 30, mounted on a shaft 32, is manually pivoted to select the direction of drive of the electric motor 14, 16. An upper surface portion 34 of the trigger 20 cooperates with the shaft 32 to prevent actuation of the reversing lever 30 when the trigger 20 is depressed, as will be described more fully later.

Figure 4:
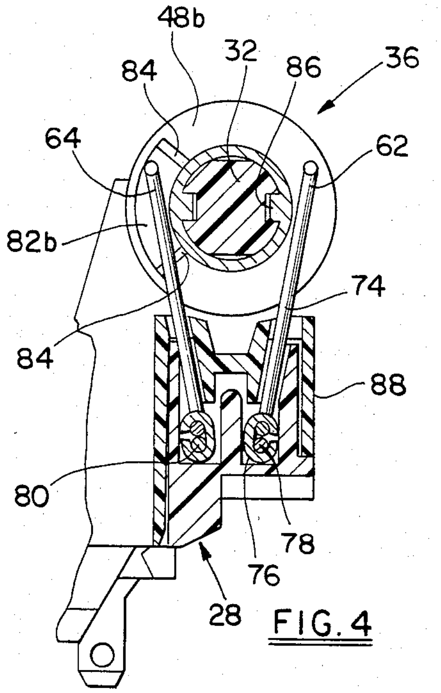
FIG. 4 is a section on the line IV—IV of FIG. 3.

FIGS. 2, 3 and 4 show in greater detail a switching device 36 mounted on the printed circuit board 28 for changing direction of the electric motor by changing the direction of electrical supply through the commutator 24 and field coils 16.

FIG. 2 shows the annular-like printed circuit board 28 which comprises two layers or plates 28*a*, 28*b* of insulating material laminated together with a plurality of electrically conductive paths therebetween, the layer 28*a* being broken away to show two of the main conductive paths 38*a* and 38*b*. The shaft 32, with the lever 30 securely mounted on one end thereof, is made of electrically insulating material and is rotatably mounted in a pair of electrically conductive metal brackets 40*a*, 40*b* upstanding from the printed circuit board 28. The shaft 32 has non-rotatably mounted thereon, between and adjacent the brackets 40*a*, 40*b*, two identical electrically conductive metal bushes 42 each having a flange 44 at the inner end thereof. A central shoulder 46 of electrically insulating material is secured on the shaft 32 midway between the bushes 42. Insulating cap-like collars 48*a*, 48*b* of electrically insulating material are non-rotatably secured to the shaft 32 between the central shoulder 46 and each of the bushes 44, with the cap-like end portions of the collars 48*a*, 48*b* engaging over and insulating the flanges 44 of the bushes 42. A flange 50 on the shaft 32 engages the outside of the bracket 40*a* and a spring washer 54 is mounted between the other bracket 40*b* and a retaining ring 52 mounted on the shaft 32 to retain the shaft axially. In the annular grooves between the cap-like portions of the collars 48*a*, 48*b* and the central shoulder 46 are located resiliently biased electrical contacts 60, 62, 64 and 66 as will be described in greater detail below.

FIG. 3 shows the brackets 40*a*, 40*b* secured to the printed circuit board 28 by integral clips 68*a*, 68*b* passing through and bent under the layer 28*a*. The clips 68*a*,68*b* are electrically connected respectively to the conductive paths 38*a*, 38*b* shown in FIG. 2. The brackets 40*a*, 40*b* extend upwardly from the printed circuit board 28 and rotatably support in parallel and spaced relationship thereto the shaft 32. The various components mounted on the shaft 32 and described in relation to FIG. 2 can be clearly seen, the flanges 44 of the bushes 42 being shown in broken lines inside the cap-like portions of the insulating collars 48*a*, 48*b*. The central shoulder 46 is annular except for a flat 70 formed diametrically on each side thereof, see also FIG. 2. The two contacts 60,62 are formed with hook-like ends on resilient arms 72,74, respectively, mounted on and cantilevered upwardly from the printed circuit board 28. Both contacts 60,62 are formed from a single piece of heavy gauge wire bent generally in the shape of a U with the base of the U secured in a conductive split sleeve 76 mounted on the printed circuit board 28. A supply lead 78 from the trigger switch 20 (see FIG. 1) is clamped in electrical contact with the common base of the arms 72, 74 within the sleeve 76. The other pair of contacts 64, 66, shown in broken lines on the other side of the shaft 32, are similarly formed from a single piece of wire of generally U-shaped configuration the base of which is clamped in electrical contact with the other supply lead 80 from the trigger switch. Each of the insulating collars 48*a*, 48*b* has a single window 82*a*, 82*b*, respectively, therein and through which the curved ends of the contacts 60, 62, 64, 66 can penetrate when registered therewith and make electrical contact with one of the flanges 44 of the conductive bushes 42. The window 82*b* in the collar 48*b* is displaced 180 degrees about the rotational axis of the shaft 32 with respect to the window 82*a* in the collar 48*a*, that is, the windows 82*a* and 82*b* are always disposed on diametrically opposite sides of the shaft 32. As can be seen in both FIGS. 2 and 3, the contact 60 is in engagement through the window 82*a* with the left hand conductive flange 44, and the contact 64 is engaged through the window 82*b* with the right hand conductive flange 44; whereas, the contacts 62 and 66 are held out of engagement with the conductive flanges 44 by the insulating collars 48*b*, 48*a*, respectively.

FIG. 4 is a section of the line IV—IV of FIG. 3 and clearly shows the window 82*b* in the insulating collar 48*b* with the contact 64 engaging through the window. The ends of the arcuate window 82*b* are chamfered at 84 to facilitate passage of the contact 64 (or 62) into and out of the window 82*b* as rotation of the shaft 32 rotates the collar 48*b*, the collar 48*b*, being keyed at 86 to the shaft 32 for rotation therewith. The window 82*a* is similarly formed in the other collar 48*a* but the collar 48*a* is keyed to the shaft 32 so that the windows 42*a* and 42*b* remain diametrically opposed on opposite sides of the shaft 32. As can be seen from both FIGS. 3 and 4, a housing 88 of electrically insulating material extends upwardly from the printed circuit board 28 to closely adjacent the periphery of the insulating collars 48*a*, 48*b*, the housing 88 enclosing the arms 72, 74 of the contacts and completing the insulation thereof.

In operation, with the various parts in the positions they occupy in FIGS. 2, 3 and 4, the supply leads 78, 80 are connected via the contacts 60, 64 and the conductive paths 38*a*, 38*b* to the coils 16 and commutator 24 for rotation of the armature 14 in one direction. To reverse the direction of rotation of the armature 14, the lever 30 is rotated in either direction through 180 degrees, this rotating the shaft 32 and the windows 82*a* and 82*b* through 180 degrees so causing the insulating collars 48*a*, 48*b* to move the contacts 60, 64 out of electrical contact with the conductive bushes 42; at the same time the other two diametrically opposed contacts 62, 66 engage through the windows 82*b* and 82*a*, respectively, to make electrical contact with the bushes 42 and reverse the direction of current from the supply leads 78, 80 to the commutator 24 and field windings 16. The resiliency and cantilevered disposition of the arms of the respective contacts ensures good electrical contact with the faces of the flanges 44, and the bushes 42 are arranged to make good sliding electrical contact with the brackets 40*a*, 40*b*.

As can be seen from FIG. 4, the window 82*b* (and likewise the window 82*a*) occupies less than a quadrant of the insulating collar 48*b*. Consequently, during rotation of the shaft 32 there will occur a period when the window 82*b* is disposed completely between the contacts 64, 62, the latter then both being out of contact with the conductive flange 44. Similarly, the other window 82*a* will at the same time be disposed completely between the contacts 60 and 66. Thus, during rotation of the lever 30 from the forward to the reverse direction of the motor, and vice versa, there is a period when all four contacts 60 to 66 are insulated by the collars 48*a*, 48*b* from the terminals 44 and power is interrupted to the electric motor. The shorter the arcuate length of the windows 82*a*, 82*b*, the longer the period for which power to the motor is interrupted during rotation of the shaft 32 if the trigger 20 were in the depressed condition and supplying power to the supply lead 78, 80.

However, the present invention provides a further feature for preventing reversal of the motor while power is connected. The trigger 20 moves under the shaft 32 when depressed to energise the drill. The shoulder 70 is arranged to normally block such movement of the trigger; however, when either of the flats 70 is located at the bottom of the shaft (as in FIG. 2), the trigger can pass under the shoulder 70. Thus, the trigger 20 can only be depressed to energise the drill after the lever 30 has correctly rotated the shaft 32 to either the forward or reverse direction position. With the trigger 20 so depressed, then any attempted rotation of the lever 30 is blocked by the lower flat 70 engaging the surface 34 of the trigger 20. When the trigger 20 is released, the surface 34 moves sufficiently to the left (in FIG. 1) to allow rotation of the shoulder 70.

Figure 5:
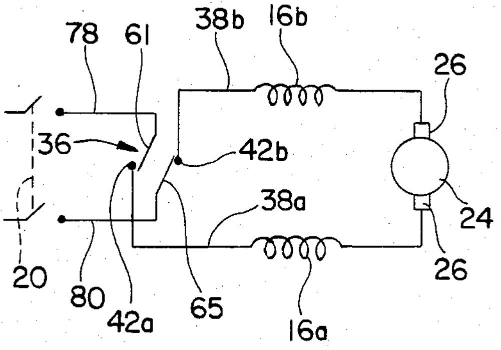
FIG. 5 is a schematic circuit diagram illustrating the electrical connection of the switching device to the electric motor.

FIG. 5 schematically shows the electrical connections between the trigger switch 20, the switching device 36, the field coils 16 designated separately 16a and 16b, the brushes 26 and the commutator 24. The movable contact 61 represents the pair of connected contacts 60, 62, and the movable contact 65 represents the other pair of connected contacts 64, 66. The stationary contacts 42a, 42b represent the two bushes 42. The supply leads 78, 80 from the trigger switch 20 are connected to the movable contacts 61, 65, and the stationary contacts 42a, 42b are connected respectively via the conductive paths 38a and 38b to the field coils 16a and 16b. With the shaft 32 in the position of FIGS. 2, 3 and 4, the movable contacts 61, 65 are connected respectively to the stationary contact 42a, 42b and the motor rotates in one direction. Upon rotating the lever 30 through 180 degrees, the movable contacts 61, 65 are moved respectively into contact with the stationary contacts 42b, 42a, so causing the direction of the current through the field coils 16a, 16b and the commutator 24 to be reversed and rotate the motor in the opposite direction.

It will be apparent that the above embodiment of the invention provides a simplified switching device for reversing the commutation of the motor and one which readily incorporates in a simple manner features for preventing reversal while power is still being supplied to the motor.

It will also be appreciated that the mounting of the switching device 36 on the circuit board 28 facilitates electrical connection thereof and assembly in the portable power tool with consequential cost savings.

Although the above described rotatable arrangement of the bush terminals 42 is preferred, it will be appreciated that the bushes 42 may be formed integrally with, or secured to, the lug-like distal ends of the brackets 40a, 40b, with the insulating collars 48a, 48b being rotatable over and relative to the flanges 44.

The above described embodiments, of course, are not to be construed as limiting the breadth of the present invention. Modifications, and other alternative constructions, will be apparent which are within the spirit and scope of the invention as defined in the appended claims.

What is claimed is:

1. A portable electric tool, comprising:

an electric motor having two directions of rotation;

a switching device for reversing the direction of the current through the motor to reverse the direction of rotation thereof;

a circuit board electrically connected to said motor;

said switching device comprising two pairs of contacts which extend in caltilever fashion from said circuit board, a rotatable shaft having axially spaced apart terminals thereon, and said terminals being electrically insulated from said contacts by insulating collars secured to said shaft;

each of said collars having a window therein for access to the respective terminal; and said contacts being resiliently biased against said collars with one of each pair of contacts engaging a respective terminal through the respective window in one direction of rotation of the motor, and the other of each pair of contacts engaging the opposite respective terminal through the respective window in the opposite direction of rotation of the motor.

2. The portable electric tool of claim 1, comprising a pair of brackets mounted on and extending from said circuit board and rotatably supporting said shaft.

3. The portable electric tool of claim 2, wherein said brackets electrically connect said terminals to said circuit board.

4. The portable electric tool of claim 1, wherein each pair of contacts is formed from a single conductor shaped to have two cantilevered portions connected by a base portion, said base portion being secured to and electrically connected to said circuit board.

5. The portable electric tool of claim 4, wherein said single conductor comprises resilient wire and the end of each cantilevered portion is curved.

6. The portable electric tool of claim 1, wherein, said windows are offset from each other by 180 degrees with respect to the axis of rotation of said shaft.

7. The portable electric tool of claim 1, wherein said shaft has an operating member at one end for manual rotation of said shaft by an operator, and said windows are arranged so that in an intermediate rotational position of said shaft between opposite directions of rotation of said motor all said contacts are electrically insulated from said terminals by said insulating collars.

8. The portable electric tool of claim 1, wherein said insulating collars each comprise a portion keyed to said shaft and a cap-like portion engaged over the respective terminal.

9. The portable electric tool of claim 8, wherein said terminals comprise flanged bushes.

10. The portable electric tool of claim 1, further comprising a trigger actuated on/off switch, and means for blocking rotation of said shaft when the trigger of said switch is depressed to energize said motor.

11. The portable electric tool of claim 10, wherein said blocking means comprises an annular shoulder on said shaft between said terminals, said shoulder having a pair of diametrically opposed flats thereon which accommodate movement of said trigger only when said shaft is correctly positioned for rotation of said motor in one or the other direction of rotation.

12. The portable electric tool of claim 1, wherein said circuit board comprises an annular printed circuit board through the center of which a commutator of said motor extends, said circuit board is perpendicular to the axis of rotation of said motor, said shaft is parallel and in spaced relationship to said circuit board, and said pairs of contacts are located on opposite sides of said shaft.

13. In a portable electric tool having a reversible electric motor, a switching device for reversing the motor comprising:

a rotatable shaft;

two bush-like terminals spaced apart axially on said shaft;

two pairs of contacts disposed on opposite sides of said shaft between said terminals;

a pair of collars of electrically insulating material secured to said shaft for rotation therewith, each collar having a window therein and said windows being offset from each other with respect to the axis of rotation of said shaft;

each pair of contacts comprising two resilient arms electrically connected together;

one resilient arm of each pair of contacts being resiliently biased against one of said collars, and the other resilient arm of each pair of contacts being resiliently biased against the other of said collars; and one contact of each said pair of contacts engaging through one of said windows and making electrical contact with one of said terminals in one rotational setting of said shaft, and the other of each said pair of contacts engaging through one of said windows and making electrical contact with the opposite terminal in another rotation setting of said shaft.

14. The switching device of claim 13, wherein each pair of contacts are formed from a single wire shaped in the form of a U, the end of each said arm engageable through the respective window being curved.

15. A portable electric tool, comprising:

a reversible electric motor having a commutator;

an annular printed circuit board through the center of which said commutator extends, said printed circuit board electrically connecting components of said motor;

a trigger actuated on/off switch for energising said motor;

a shaft of electrically insulating material rotatably mounted on said printed circuit board in parallel spaced relation thereto and having a control member mounted on one end thereof for manual rotation thereof;

a shoulder of electrically insulating material on said shaft intermediate the length thereof for rotation therewith, said shoulder having two diametrically opposed flats thereon for accommodating the trigger of said switch when actuated in either one of two rotational positions of said shaft, said flats coacting with said trigger to prevent rotation of said shaft while said trigger is being so actuated;

two electrically conductive bush-like terminals spaced apart axially on said shaft;

two pairs of contacts disposed on opposite sides of said shaft between said terminals, the two contacts of each said pair of contacts being electrically connected together;

said shoulder being disposed between said terminals and separating the contacts of each said pair of contacts;

a pair of collars of electrically insulating material secured to said shaft for rotation therewith, said collars being disposed between said shoulder and said terminals, each collar having a cap-like portion engaging over one of said terminals and a window therein for providing access to that terminal;

the contacts of each said pair of contacts being resiliently biased in opposite directions against said collars; and one contact of each said pair engaging through the window in the respective collar to contact the terminal associated therewith in one of said rotational positions of said shaft, and the other contact of each said pair engaging through the window in the other respective collar to contact the opposite terminal in the other of said rotational positions of said shaft, whereby the direction of current through said commutator can be reversed.

16. The portable electric tool of claim 15, wherein said shaft is rotatably mounted in two metal brackets mounted on and extending from said printed circuit board, said brackets electrically connecting said terminals to said printed circuit board, and said contacts are mounted on and extend in cantilever fashion from said printed circuit board.

17. The portable tool of claim 16, further comprising a housing of insulating material mounted on said printed circuit board and surrounding said contacts, said housing extending between said printed circuit board and the cap-like portions of said collars.

* * * * *